(12) United States Patent
Furuya et al.

(10) Patent No.: US 9,947,911 B2
(45) Date of Patent: Apr. 17, 2018

(54) BATTERY PACK

(75) Inventors: Yoshinobu Furuya, Kakegawa (JP); Shigeyuki Ogasawara, Kakegawa (JP); Hideki Inoue, Tokyo (JP); Shuichi Nagata, Toyota (JP); Takao Syoji, Kakegawa (JP)

(73) Assignees: YAZAKI CORPORATION, Minato-ku, Tokyo (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 454 days.

(21) Appl. No.: 14/234,722

(22) PCT Filed: Jul. 25, 2012

(86) PCT No.: PCT/JP2012/069526
§ 371 (c)(1),
(2), (4) Date: Jan. 24, 2014

(87) PCT Pub. No.: WO2013/015446
PCT Pub. Date: Jan. 31, 2013

(65) Prior Publication Data
US 2014/0154531 A1 Jun. 5, 2014

(30) Foreign Application Priority Data
Jul. 28, 2011 (JP) .................................. 2011-165126

(51) Int. Cl.
*H01M 2/00* (2006.01)
*H01M 2/20* (2006.01)
(Continued)

(52) U.S. Cl.
CPC ............. *H01M 2/20* (2013.01); *H01M 2/206* (2013.01); *H01M 10/425* (2013.01); *H01M 10/482* (2013.01); *H01M 2220/20* (2013.01)

(58) Field of Classification Search
CPC ............. H01M 10/482; H01M 10/425; H01M 2220/20; H01M 2/20; H01M 2/206
See application file for complete search history.

(56) References Cited

U.S. PATENT DOCUMENTS

| | | | |
|---|---|---|---|
| 2002/0102457 | A1 | 8/2002 | Oogami et al. |
| 2011/0027634 | A1 | 2/2011 | Kishimoto et al. |
| 2012/0038365 | A1 | 2/2012 | Nagata et al. |

FOREIGN PATENT DOCUMENTS

| | | |
|---|---|---|
| CN | 101964408 A | 2/2011 |
| CN | 101989670 A | 3/2011 |

(Continued)

OTHER PUBLICATIONS

Office Action dated Nov. 26, 2013 issued by the Japanese Patent Office in Application No. 2011-165126.

(Continued)

*Primary Examiner* — Nicholas P D'Aniello
*Assistant Examiner* — Philip A Stuckey
(74) *Attorney, Agent, or Firm* — Sughrue Mion, PLLC

(57) ABSTRACT

A battery pack includes a battery assembly having a plurality of battery cells, a busbar module that includes a plurality of conductors and an insulating member which holds the conductors, a battery control unit provided at an end portion of the battery assembly in an arrangement direction of the battery cells, and an extraction conductor that connects a total electrode terminal connected to the battery assembly to a main circuit terminal of the battery control unit. The extraction conductor has a water escape portion which is located below an imaginary line connecting the total electrode terminal to the main circuit terminal, and an upper end of the water escape portion is formed at a location that is lower than a lower end of the main circuit terminal.

11 Claims, 3 Drawing Sheets

(51) Int. Cl.
*H01M 10/42* (2006.01)
*H01M 10/48* (2006.01)

(56) References Cited

FOREIGN PATENT DOCUMENTS

| | | |
|---|---|---|
| EP | 2 290 733 A1 | 3/2011 |
| JP | 11-167911 A | 6/1999 |
| JP | 2009-289431 A | 12/2009 |
| JP | 2010-3466 A | 1/2010 |
| JP | 2010-61814 A | 3/2010 |
| JP | 2010-257686 A | 11/2010 |
| JP | 2011-28871 A | 2/2011 |
| WO | WO 2010122412 A1 * 10/2010 | ............ H01M 2/206 |

OTHER PUBLICATIONS

International Search Report dated Sep. 19, 2012 issued in International Application No. PCT/2012/069526 (PCT/ISA/210).
Written Opinion dated Sep. 19, 2012 issued in International Application No. PCT/2012/069526 (PCT/ISA/237).
Office Action dated Jul. 31, 2015, issued by the State Intellectual Property Office of P.R. China in counterpart Chinese Application No. 201280037851.2.

\* cited by examiner

BATTERY PACK

TECHNICAL FIELD

The present disclosure relates to a battery pack, for instance, a battery pack used as a DC power source for driving an electric motor in an electric vehicle and a hybrid electric vehicle.

BACKGROUND ART

As described in connection with Patent Literature (PTL) 1, a battery pack of this type has a battery assembly in which a plurality of battery cells are arranged in such a manner that positive electrodes and negative electrodes of the battery cells adjoin each other and serially interconnecting and bundling the positive electrodes and the negative electrodes of the adjoining battery cells by conductors referred to as busbars. The battery assembly is used while being contained in a housing as necessary. A positive electrode (hereinafter called a "total positive electrode") and a negative electrode (hereinafter called a "total negative electrode") of battery cells at both ends of the battery assembly work as DC outputs of the battery pack.

In a battery pack, a battery control unit for controlling the battery assembly is sometimes provided at end portion of the battery assembly in a direction where the battery cells are aligned. The battery control unit has, for instance, a current sensor for detecting an electric current output from a battery pack, a precharge contactor, a main contactor, and others. The battery control unit is used while the total electrode terminals, or the total positive terminal and the total negative terminal of the battery assembly, are connected to a controller of a load by way of the battery control unit.

CITATION LIST

Patent Literature

[PTL 1] JP-A-2009-289431

SUMMARY OF INVENTION

Technical Problem

However, according to PTL 1, the total electrode terminals are positioned on an upper surface of the battery assembly, and a main circuit terminal pulled out of an interior of the battery control unit are positioned so as to be flush with the total electrode terminals. The total electrode terminals and the main circuit terminal are connected together by a linear extraction conductor having a linear shape. Therefore, there is a potential of a fluid, such as water, intruding into the battery control unit while running along the linear extrusion conductors. Specifically, there arises a problem, such as that will be described below. For instance, if a liquid, like water, that has condensed from moisture in the atmosphere for reasons of day-night air temperature difference within the busbar module containing a conductor of the battery main circuit intrudes into the battery control unit while running along the extraction conductor, the liquid will cause a failure.

A problem that the present disclosure is to solve is to prevent a liquid, like water, from intruding into a battery control unit while running along an extraction conductor connected to a battery main circuit.

Solution to Problem

In order to solve the problem, the present disclosure provides a battery pack including a battery assembly that includes a plurality of battery cells which are arranged while positive electrodes and negative electrodes of the battery cells are alternately adjoined each other; a busbar module that includes a plurality of conductors and an insulating member which holds the conductors, each of the conductor interconnecting the positive electrode and the negative electrode of each of the adjoining battery cells in the battery assembly; a battery control unit provided at an end portion of the battery assembly in a direction in which the battery cells are arranged; and an extraction conductor that connects a total electrode terminal connected to a total positive electrode or a total negative electrode of the battery assembly to a main circuit terminal of the battery control unit, wherein the extraction conductor has a water escape portion which is located below an imaginary line connecting the total electrode terminal to the main circuit terminal, and an upper end of the water escape portion is formed at a location that is lower than a lower end of the main circuit terminal.

Since the present disclosure is configured as mentioned above, a fluid running along the extraction conductor, like water, falls down to the water escape portion by gravitation. However, the upper end of the water escape portion is situated below the lower end of the main circuit terminal, the fluid will not rise upwardly against gravity from the water escape portion toward the main circuit terminal of the battery control unit. As a consequence, the fluid running along the extraction conductor of the battery main circuit, like water, flows to a position that is lower than the main circuit terminal of the battery control unit, by virtue of the water escape portion of the extraction conductor. Hence, the fluid can be prevented from intruding into the battery control unit along the extraction conductor.

In the present disclosure, for example, the extraction conductor has a first cutout portion which is located between the total electrode terminal and the main circuit terminal, the water escape portion has a second cutout portion so that the water escape portion is shaped in U shape, the second cutout portion being communicated with the first cut out portion, and a bottom of the second cutout portion is formed at a position lower than the lower end of the main circuit terminal.

Also, for example, the total electrode terminal and the main circuit terminal are formed respectively on a side surface of the battery assembly and a side surface of the battery control unit on the same side.

Also, for example, both ends of the extraction conductor are fastened respectively to the total electrode terminal and the main circuit terminal with a bolt or a nut.

Also, for example, the extraction conductor is contained in a resin case, and an opening is formed in a bottom surface of the case. By this configuration, the liquid flowing downwardly after running along the extraction conductor can be discharged outside of the case.

Furthermore, for example, the resin case has a rib to be held in the first cutout portion of the water escape portion.

Advantageous Effects of Invention

The present disclosure makes it possible to prevent a liquid, like water, from intruding into a battery control unit while running along an extraction conductor connected to a battery main circuit.

DESCRIPTION OF EMBODIMENTS

Figure 3:
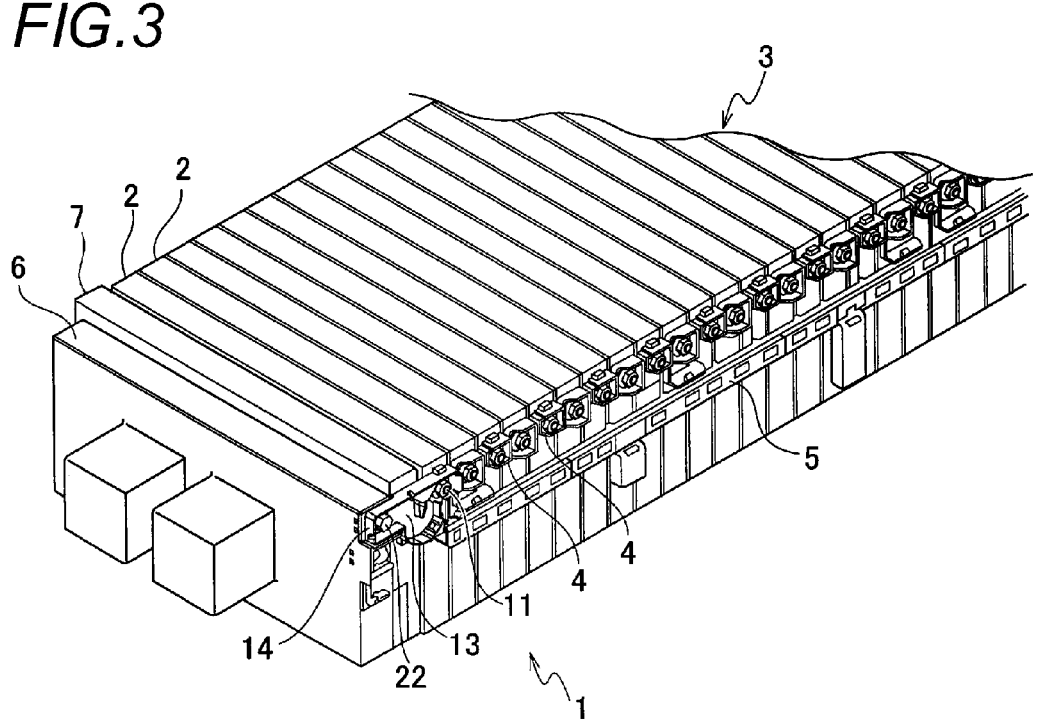
FIG. 3 is a perspective external view of the entirety of the battery pack shown in FIG. 1 according to the embodiment.

FIG. 3 shows a perspective structural view of a battery pack 1 of according to an embodiment of the present disclosure. The battery pack 1, for instance, is used as a DC power supply for activating an electric motor of an electric vehicle. As illustrated, a plurality of thinly-formed battery cells 2, like lithium batteries, are arranged as a battery assembly 3. The plurality of battery cells 2 are alternately arranged in such a manner that positive electrodes and negative electrodes of the battery cells are adjoined each other. The positive electrodes and the negative electrodes of the adjoining battery cells 2 are connected in series by respective conductors 4 referred to as busbars. The number of serially-connected battery cells 2 of the battery assembly 3 is determined according to a desired DC voltage. The positive electrode (hereinafter called a "total positive electrode") and the negative electrode (hereinafter called a "total negative electrode") of the battery cells 2 disposed at both ends of the battery assembly 3 work as DC outputs of the battery pack 1.

When the number of serially-connected battery cells 2 is an odd number, the total positive electrode and the total negative electrode are situated at respective opposite sides of the battery assembly 3. By contrast, when the number of serially-connected battery cells is an even number, the total positive electrode and the total negative electrode are situated at the same side of the battery assembly 3. The present embodiment is an example in which the number of battery cells connected in series is an odd number.

The plurality of conductors 4 that interconnect the adjoining positive and negative electrodes of the plurality of battery cells 2 are placed within a case formed from a resin member, or an insulating member, and that is formed as a busbar module 5. Although unillustrated by the drawing, a columnar positive terminal or a columnar negative terminal projecting from a side surface of the battery cell is connected to the positive or negative electrode of each of the battery cells 2 in the present embodiment, and a screw thread is formed on an exterior surface of each of the columnar electrode terminals. A pair of holes are drilled in each of the conductors 4 in alignment with positions of the positive electrode terminal and the negative electrode terminal of the adjoining battery cells 2. The respective electrode terminals are inserted into the corresponding holes of the conductor 4, and nuts are screw-engaged with the respective screw threads of the respective electrode terminals, whereby the conductor 4 is fastened to the respective electrode terminals. Incidentally, the columnar electrode terminals of the total positive electrodes or the total negative electrodes of the battery cells 2 situated at both ends of the battery assembly 3 are not connected to the electrode terminals of the adjoining battery cells 2 and pulled outside by means of an extraction conductor.

In the meantime, the battery pack 1 is equipped with a battery control unit 6 that is intended for controlling the battery assembly 3 and that is positioned at an end of the battery assembly 3 along a direction in which the battery cells 2 are arranged. Although unillustrated, the battery control unit 6 is formed from pieces of control equipment housed in a plastic case, for instance, a current sensor for detecting an electric current output from the battery pack 1, a main contactor for turning on/off an output from the battery pack 1, a precharge contactor for turning on the output from the battery pack 1 for a given period of time before turning on the main contactor; and the like. In the present embodiment, the battery control unit 6 is fastened to the total-negative-electrode-side battery cell 2 at the end of the battery assembly 3 with an end plate 7 sandwiched therebetween. The end plate 7 is a member that is situated at either end of the battery assembly 3 in order to bundle the plurality of arranged battery cells 2. Although unillustrated, the battery assembly 3 may be contained in a housing, if needed.

Figure 1:
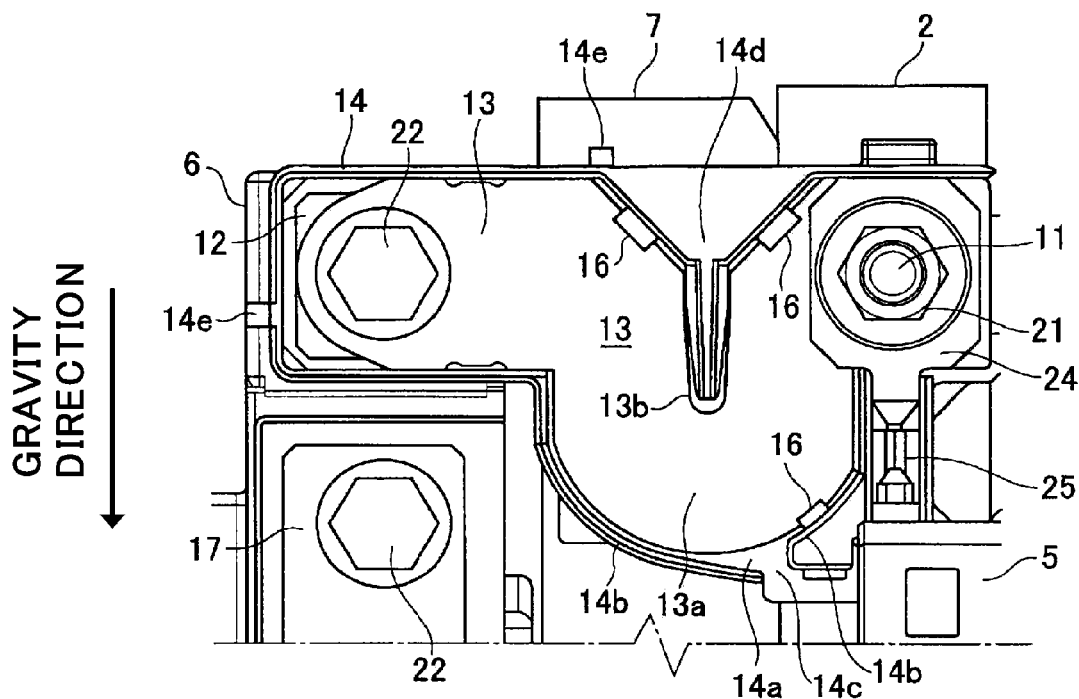
FIG. 1 is a view showing a configuration of an extraction conductor that connects a total electrode terminal with a main circuit terminal of a battery control unit in a battery pack according to an embodiment of the present disclosure.
Figure 2:
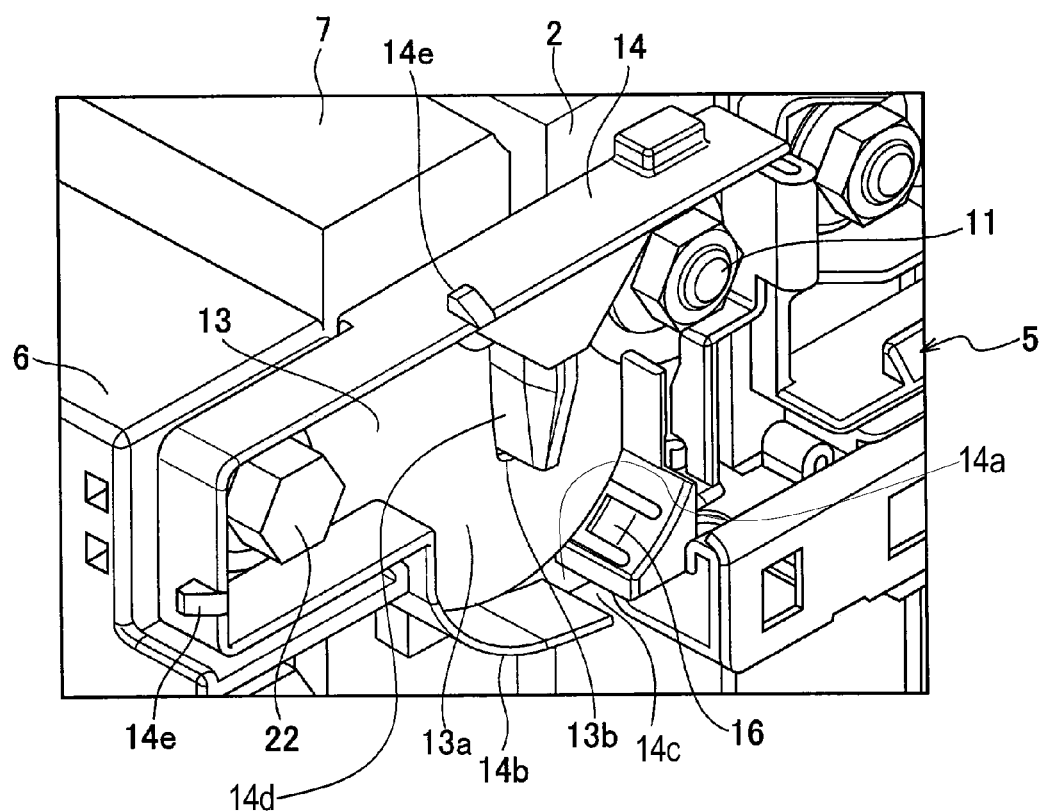
FIG. 2 is a perspective view of a principal block of the battery pack shown in FIG. 1 according to the embodiment.

By reference to FIG. 1 and FIG. 2, there is described a configuration of the extraction conductor, which is a characteristic part of the above-configured battery pack 1 of the present embodiment, for connecting the total negative electrode terminal to the main circuit terminal 12 of the battery control unit 6. FIG. 1 is a front view showing a surface of an end portion on which a total negative electrode terminal 11 is formed, where the battery control unit 6 is positioned, of the battery assembly 3 shown in FIG. 3. As illustrated, in the present embodiment, the total negative electrode terminal 11 connected to a total negative electrode is connected to one main circuit terminal 12 provided on the side surface of the battery control unit 6 by way of an extraction conductor 13. In addition, an unillustrated total positive electrode terminal is connected to the other main circuit terminal 17 of the battery control unit 6 by way of a cable.

The side surface of the battery assembly 3 where the total negative electrode terminal 11 is formed and the side surface of the battery control unit 6 are placed so as to become flush with each other. The total negative electrode terminal 11 connected to the total negative electrode of the battery assembly 3 corresponds to a columnar body whose outer periphery is threaded and that is provided so as to project from a side surface of the battery cell 2. In addition, the main circuit terminal 12 of the battery control unit 6 is provided so as to project from the side surface of the battery control unit 6, and a screw hole is drilled in a leading-end face of the main circuit terminal 12. The total negative electrode terminal 11 and a leading end face of the main circuit terminal 12, for instance, are positioned so as to become flush with each other. The extraction conductor 13 for connecting the total negative electrode terminal 11 to the main circuit terminal 12 is housed in a resin case 14. An opening is formed at a position on a base plate 14a of the case 14 that corresponds to the total negative electrode terminal 11 and the leading end face of the main circuit terminal 12. The extraction conductor 13 is thereby formed so as to be able to contact electrically to the total negative electrode terminal 11 and the leading-end face of the main circuit terminal 12 by way of the opening.

The extraction conductor 13 is formed so as to have a straight conductor portion connecting the total negative electrode terminal 11 to the main circuit terminal 12 and a water escape portion 13a provided so as to be downwardly-extended from an arbitrary position on the straight conductor portion. A cutout 13b (first and second cutout portions) is formed in the water escape portion 13a, and the extraction conductor 13 including the water escape portion 13a is formed in a U-shape in conformance with the cutout 13b. A bottom of the cutout 13b is formed at a position that is lower than a lower end of the main circuit terminal 12. Further, a hole into which the total negative electrode terminal 11 is to be inserted is drilled in a position at one end of the extraction conductor 13 corresponding to the total negative electrode terminal 11. The total negative electrode terminal 11 is inserted into the hole of the extraction conductor 13, and the total negative terminal 11 is screw-engaged with a nut 21, thereby connecting the extraction conductor 13. A hole into which a bolt 22 to be screw-engaged with a screw hole drilled in the main circuit terminal 12 is drilled at a position on the other end of the extraction conductor 13 corresponding to the main circuit terminal 12. The bolt 22 is screw-engaged into the screw hole of the main circuit terminal 12, thereby connecting the extraction conductor 13. A terminal connected to an end of an unillustrated cable is fastened to the main circuit terminal 17 by means of the bolt 22 being screw-engaged into the screw hole of the main circuit terminal 17 by way of the bolt hole of the terminal.

An outer wall 14b surrounding an outer circumference of the extraction conductor 13 is formed on the base plate 14a of the case 14, and a portion of the outer wall 14b situated at a position corresponding to the bottom of the water escape portion 13a of the extraction conductor 13 is cut out, thereby forming an opening 14c. A plurality of claws 16 are provided on an inner surface side of the outer wall 14b, to thus hold the extraction conductor 13 mounted on the case 14. Further, a rib 14d to be inserted into the cutout 13b of the extraction conductor 13 is formed on the base plate 14a in a projecting manner. Although unillustrated, engagement projections 14e are accordingly provided on an exterior circumference of the outer wall 14b in the present embodiment, whereby a cover is to be attached to the case 14.

One voltage detection terminal 24 for detecting a voltage of each of the battery cells 2 and the extraction conductor 13 are jointly fastened and connected to the total negative electrode terminal 11. A voltage detection line 25 is pressure-bonded to the voltage detection terminal 24, whereby the voltage detection terminal 24 is connected to an unillustrated controller of the battery pack 1.

As mentioned above, in the present embodiment, a liquid, like water, intruded into the case 14 after running along the extraction conductor 13 falls on the downwardly-extending water escape portion 13a by gravitation. Since a bottom of the cutout 13b is situated at a position lower than the lower end of the main circuit terminal 12, the liquid will not rise from the water escape portion 13a toward the main circuit terminal 12 against gravity. Consequently, the liquid, such as water, intruded into the case 14 can be prevented from intruding into the battery control unit 6 while running along the extraction conductor 13. As a consequence, a failure, which would otherwise occur as a result of a liquid, like water, intruding into the battery control unit 6, can be prevented.

According to the present embodiment, the opening 14c is formed in the bottom surface of the case 14, so that the liquid falling down while running along the extraction conductor 13 can be discharged outside the case. Furthermore, in this case, the rib 14d conforming to the shape of the cutout 13b of the water escape portion 13a is formed so as to project from the base plate 14a, whereby a path along which a liquid like water will run directly to the main circuit terminal 12 along the extraction conductor 13 is blocked. Hence, intrusion of a liquid into the battery control unit 6 can be prevented without fail.

Although the case 14 of the embodiment can be formed integrally with the resin case of the busbar module 5, the busbar module 5 is not limited to this configuration. The busbar module 5 and the case 14 can be separately formed.

The present application is based on Japanese Patent Application No. 2011-165126 filed on Jul. 28, 2011, the contents of which are incorporated herein by reference.

INDUSTRIAL APPLICABILITY

By the above configuration, a battery pack in which a liquid, like water, is prevented from intruding into a battery control unit while running along an extraction conductor connected to a battery main circuit, can be achieved.

REFERENCE SIGNS LIST 1 battery pack
2 battery cell
3 battery assembly
4 conductor
5 busbar module
6 battery control unit
11 total negative terminal
12 main circuit terminal
13 extraction conductor
13a water escape portion
13b cutout portion
14 case
14a base plate
14b exterior wall
14c opening
14d rib
14e engagement projection
16 claw

The invention claimed is:
1. A battery pack comprising:
a battery assembly that includes a plurality of battery cells which are arranged while positive electrodes and negative electrodes of the battery cells are alternately adjoined each other;
a busbar module that includes a plurality of conductors and an insulating member which holds the conductors, each of the conductors interconnecting the positive electrode and the negative electrode of each of the adjoining battery cells in the battery assembly;
a battery control unit provided at an end portion of the battery assembly in a direction in which the battery cells are arranged;
an extraction conductor that connects a total electrode terminal connected to a total positive electrode or a total negative electrode of the battery assembly to a main circuit terminal of the battery control unit;
wherein the extraction conductor comprises a straight conductor portion and a water escape portion, and the straight conductor portion comprises a first hole for which the electrode terminal is inserted and a second hole for which the main circuit terminal is engaged, the first hole and the second hole are provided on opposite ends of the straight conductor portion;
the water escape portion of the extraction conductor protrudes from a bottom edge of the straight conductor portion, wherein an upper end of the water escape portion is formed at a location that is lower than a lower end of the main circuit terminal, thereby allowing fluid to escape from the main circuit terminal;

wherein the extraction conductor has a first cutout portion and a second cutout portion, the second cutout portion being an extension of the first cutout portion that extends into the water escape portion, and the first cutout portion and the second cutout portion are located between the first hole and the second hole;

wherein the second cutout portion that extends into the water escape portion forms the water escape portion into a U shape;

wherein a bottom of the second cutout portion is formed at a position lower than the lower end of the main circuit terminal; and wherein the first cutout portion and the second cutout portion are located entirely between the first hole and the second hole.

2. The battery pack according to claim 1, wherein the total electrode terminal and the main circuit terminal are formed respectively on a side surface of the battery assembly and a side surface of the battery control unit on the same side.

3. The battery pack according to claim 1, wherein both ends of the extraction conductor are fastened respectively to the total electrode terminal and the main circuit terminal with a bolt or a nut.

4. The battery pack according to claim 1, wherein the extraction conductor is contained in a resin case, and an opening is formed in a bottom surface of the case.

5. The battery pack according to claim 4, wherein the case has a rib to be held in the first cutout portion.

6. The battery pack according to claim 1, wherein the extraction conductor has a hole for inserting the total positive electrode or the total negative electrode.

7. The battery pack according to claim 1, wherein the main circuit terminal is provided on the battery control unit directly.

8. The battery pack according to claim 1, wherein the total electrode terminal and the main circuit terminal are separate from each other in the direction in which the battery cells are arranged; and wherein the first cutout portion is located between the total electrode terminal and the main circuit terminal in the direction in which the battery cells are arranged.

9. The battery pack according to claim 4, wherein the case comprises an outer wall surrounding an outer circumference of the extraction conductor, and a plurality of claws are provided on an inner surface side of the outer wall to hold the extraction conductor so that the extraction conductor is mounted on the case.

10. The battery pack according to claim 4 wherein the battery control unit is provided on an end face of the battery assembly, the end face extending perpendicularly with respect to the direction in which the battery cells are arranged.

11. The battery pack according to claim 1, wherein the water escape portion includes an opening which communicates with an inner portion of the extraction conductor and an outer surface of the extraction conductor.

* * * * *